C. B. VAN ANTWERP.
EXPANSION BOLT.
APPLICATION FILED SEPT. 25, 1915.

1,193,636. Patented Aug. 8, 1916.

Inventor:
Clarence B. Van Antwerp
By Benjamin, Roodhouse & Lundy
Attorneys.

UNITED STATES PATENT OFFICE.

CLARENCE B. VAN ANTWERP, OF CHICAGO, ILLINOIS.

EXPANSION-BOLT.

1,193,636.  Specification of Letters Patent.  Patented Aug. 8, 1916.

Application filed September 25, 1915. Serial No. 52,541.

*To all whom it may concern:*

Be it known that I, CLARENCE B. VAN ANTWERP, a citizen of the United States, and a resident of the city of Chicago, county of Cook, and State of Illinois, have invented certain new and useful Improvements in Expansion-Bolts, of which the following is a specification.

My present invention relates to improvements in expansion bolts, and has special reference to the provision of such a bolt which is of economical manufacture, and improved efficiency. As is well known, the purpose of such bolts is particularly for securing anything to concrete, brick, stone, marble, tile, granite or any substance which is brittle and will not take a thread or into which a screw cannot conveniently be driven. Expansion bolts, however, may be advantageously used with any material when a particularly strong and dependable attachment is desired.

I have sought particularly to design my present bolt so that the expanding jacket or sleeve may be made most economically, and so that its expansion will develop a maximum frictional area. I have also sought to prevent any circumferential expansion or any distortion in any manner, of the upper or outer end of the expanding sleeve so that there will be no force exerted tending to break out the edges of the hole into which the bolt is inserted. My bolt is so designed that it may be assembled at the factory and sold, and installed without taking it to pieces, and I have provided an improved and economical manner for excluding dust and foreign matter from the threaded portions thereof.

I attain the above object by means of the structure illustrated in the accompanying drawing, in which,—

Figure 1:
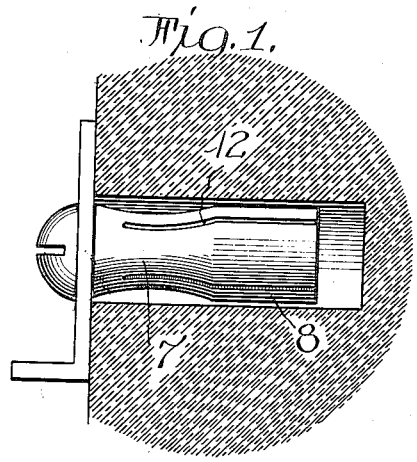
Figure 2:
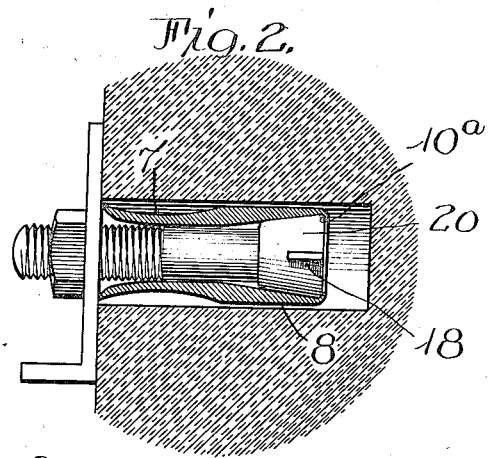
Figure 3:
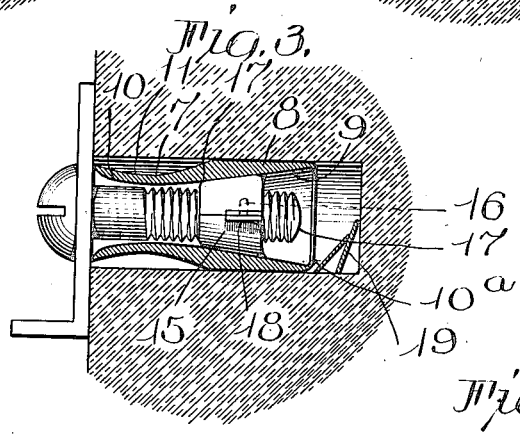
Figure 4:
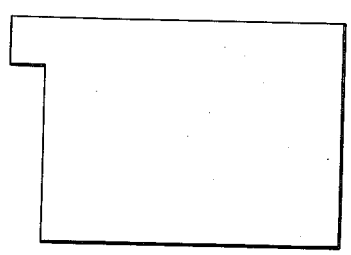
Figure 5:
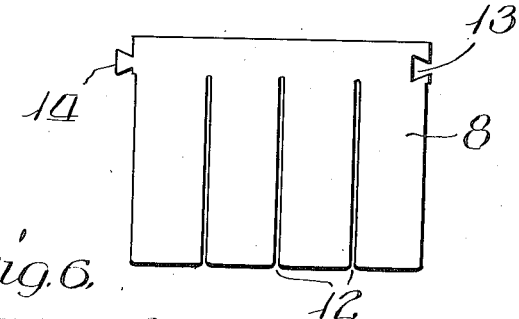

Figure 1 is a section through an installation of one of my bolts, showing the bolt, however, in full lines. Fig. 2 is a view similar to Fig. 1, showing my expansion bolt in section, the bolt not yet having been expanded. Fig. 3 is a view similar to Fig. 2, showing the bolt expanded. Figs. 4 and 5 are, respectively, a blank from which the expanding sleeve is formed and the same after it has been shaped for rolling up or forming into a complete expanding sleeve; and Fig. 6 is a view of a half of an expanding element or nut.

My device comprises essentially an expanding sleeve, 7, the outer surface of the inner end, 8, or the end which goes deepest into the hole, of which is preferably cylindrical, so that when it is expanded it will have a maximum of frictional contact with the surrounding walls of the hole. The inner surface, 9, opposite to the cylindrical portion, 8, is reduced or tapered inwardly to secure a parallel expansion of the outer cylindrical portion. Above the taper the inner surface is flaring at 10, but opposite this inner portion, 10, the outer part, 11, of the sleeve is reduced so that it will have a thinner sectional dimension and in connection with the longitudinal slotting, 12, will permit of the free expansion of the cylindrical portion. The slots, 12, are carried well up into the reduced portion, 11, but not to the top of the sleeve. The sleeve thus designed may economically be rolled from suitable metal so as to impart to it the sectional characteristics above described. It may be either rolled in a long strip, and then be blanked out, as shown in Fig. 4, or it may be blanked out and then rolled. It is then cut or provided with the slots, 12, and the mortise, 13, and tenon, 14, as clearly shown in Fig. 5, which when the blank is rolled or formed into a cylinder, engage each other and prevent any circumferential expansion of the top or lateral displacement of the meeting edges or any distortion of any kind at the upper or outer end of the expanding sleeve.

The lower or inner edge, 10$^a$, of the expanding sleeve may preferably be rolled to a thin web which may be turned over to retain the expanding element, as shown in Fig. 2. This expanding element may either be a bolt with a taper head, 20, as shown in Fig. 2, or a taper nut. But in the event a taper nut is employed, and this construction has advantages under certain conditions, I prefer to make the nut in two semi-conical sections, one of which, 15, is provided with projecting dowel pins, 16, which enter registering dowel holes, 16$^a$, in the complementary section.

Figure 6:
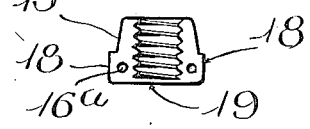

The bottom of each section is provided with a thin web or diaphragm, 19, as clearly shown in Fig. 6, which serves to keep foreign matter out of the structure, but which easily breaks out when the end of the bolt, 17, is screwed against it. The sections, 15, may also be provided with the laterally extending spurs, 18, which will engage the expansion slots, 12, so as to prevent any tendency to turn, which the expanding cone may develop.

Having described my invention, what I claim as new and desire to secure by Letters Patent is:—

1. An expansion bolt comprising an expansible sleeve consisting of a blank of suitable metal rolled with an outer substantially cylindrical section having an inner tapered surface, a portion of reduced section adjacent said cylindrical portion, longitudinal slots extending outwardly from the inner end of said sleeve through said cylindrical and tapered portion, and means for locking the meeting edges thereof at the opposite end of said sleeve blank for preventing circumferential expansion or longitudinal displacement thereof, and means for expanding the opposite end or cylindrical portion of said sleeve.

2. An expansion bolt comprising an expansible sleeve having longitudinal slots extending outwardly from the inner end thereof and means for expanding a portion of said sleeve comprising a bolt and a tapered nut engaged thereby one end of the bore of said nut being provided with a transversely disposed destructible web.

3. An expansion bolt comprising an expansible sleeve having longitudinal slots extending outwardly from the inner end thereof and means for expanding a portion of said sleeve comprising a bolt and a two piece tapered nut engaged thereby, each of the pieces of said nut being provided with a transversely disposed destructible web across the bore thereof.

4. An expanding bolt comprising an expansible shield, means for expanding the inner end thereof, said means comprising a nut provided with a destructible web across the bore thereof, and means for moving said nut and destroying said web.

Signed at Chicago, county of Cook and State of Illinois, this 21st day of September, 1915.

CLARENCE B. VAN ANTWERP.

Witnesses:
Wm. Carroll Eichelman,
Benj. T. Roodhouse.